(12) United States Patent
Ewers et al.

(10) Patent No.: US 8,066,451 B2
(45) Date of Patent: Nov. 29, 2011

(54) FLOOD/WIND RESISTANT BUILDING

(76) Inventors: James J. Ewers, Lake Wylie, SC (US); Francis P. Neumann, Midland, NC (US)

( * ) Notice: Subject to any disclaimer, the term of this patent is extended or adjusted under 35 U.S.C. 154(b) by 0 days.

(21) Appl. No.: 12/657,354

(22) Filed: Mar. 1, 2010

(65) Prior Publication Data

US 2010/0183374 A1    Jul. 22, 2010

(51) Int. Cl.
*E02D 27/32* (2006.01)
(52) U.S. Cl. ........ 405/229; 52/169.9; 52/292; 405/195.1
(58) Field of Classification Search .............. 405/195.1, 405/196, 200, 219, 227, 229, 231; 52/1, 52/169.9, 292, 296
See application file for complete search history.

(56) References Cited

U.S. PATENT DOCUMENTS

| | | | | |
|---|---|---|---|---|
| 2,715,756 A * | 8/1955 | Carver | ........................... | 405/229 |
| 5,347,949 A * | 9/1994 | Winston | ........................ | 52/169.9 |
| 5,647,693 A * | 7/1997 | Carlinsky et al. | ............. | 405/229 |
| 5,775,847 A * | 7/1998 | Carlinsky et al. | ............. | 405/229 |
| 5,904,446 A * | 5/1999 | Carlinsky et al. | ............. | 405/229 |
| 6,347,487 B1 * | 2/2002 | Davis | ................... | 52/1 |
| 7,921,604 B2 * | 4/2011 | Lino | ................... | 52/1 |
| 2004/0261338 A1* | 12/2004 | De Cherance | .................. | 52/292 |
| 2007/0166110 A1* | 7/2007 | Kenady | ........................ | 405/224 |
| 2009/0113812 A1* | 5/2009 | Lino | ................... | 52/1 |

* cited by examiner

*Primary Examiner* — Frederic L Lagman

(57) ABSTRACT

The proposed invention is a flood and wind resistant building foundation. The building construction consists of an attached superstructure to a buoyant raft foundation with steel pipe anchor and bent steel plate guide assemblies attached at the foundation corners. The raft foundation is uniformly supported on grade during dry conditions, and on water during flood conditions. The corner anchor/guide assemblies resist wind forces during dry conditions, and provide lateral stability during flood conditions. The raft foundation has plumbing trenches and access space that permit continued use of the building utilities during a flood. This building is made with standard, light weight, low technology construction materials and products with a cost comparable to traditional construction.

3 Claims, 3 Drawing Sheets

FLOOD/WIND RESISTANT BUILDING

Figure 1:
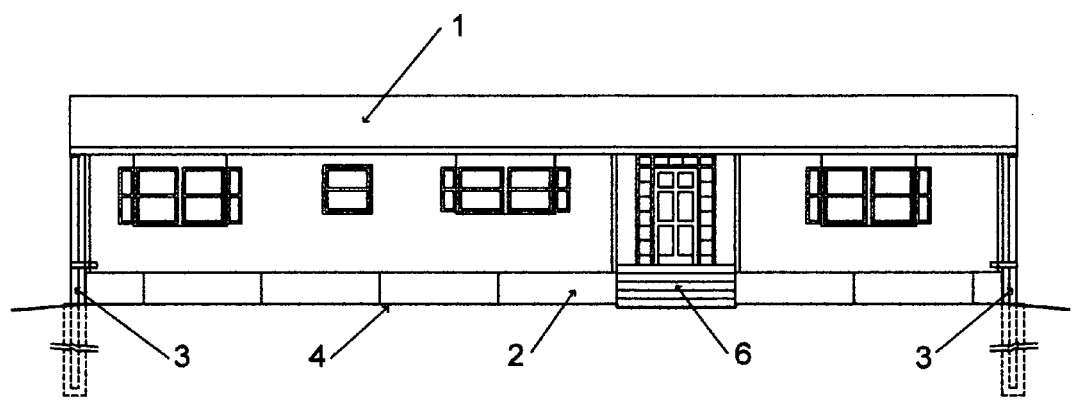

Provisional patent application No. 61/205,607 filed on Jan. 22, 2009.

No federally sponsored research/development provided.

Every year, extreme weather causes flood and wind damage to buildings located on land adjacent lakes, rivers, and seas. Regardless of this problem, buildings continue to be constructed and repaired on these lands. A solution of this problem would be the construction of flood and wind resistant buildings on these lands.

U.S. Pat. No. 6,347,487 B1 discloses a flood and wind resistant building with a superstructure attached to a floatable floor structure supported above grade on perimeter columns that bear on concrete caissons. The floatable floor structure consists of watertight air filled compartments made with floor truss joists, rectangular section beams, sheathing, and floor decking. The perimeter columns are made with attached corbels to support the floor structure during dry conditions, and with sleeve mechanisms to permit vertical movement but resist horizontal movement of the attached floor structure during flood conditions. Wind tie-down devices are attached to the floor structure, engage the corbels of the perimeter columns during dry conditions, and automatically release during flood conditions. Accessory pumps, tanks, hoses, valves, portable generator, scuttling devices, and retention devices provide for continued building occupancy during and after flood conditions. It appears that this flood and wind resistant building has not been commonly built because of its excessive cost above traditional construction. A more economical construction would include:
  a) a floatable floor structure with uniform support on grade instead of a concentrated support above grade at perimeter columns,
  b) a floatable floor structure with solid buoyant flotation billets instead of watertight air filled compartments,
  c) fewer and simpler anchor/guides for flood and wind support instead of more numerous and complicated anchor/guides for floor, flood and wind support, and
  d) modified utility connections instead of accessory equipment and devices to provide for continued utility use during flood conditions.

U.S. Patent No. 20040261338 discloses an arrangement of a buoyant foundation that typically bears on grade, and floats during a flood. This arrangement consists of an insulated floor deck, metal framework, molded plastic foam filled caissons, custom fabricated hollow metal guide masts, and a concrete slab on grade. It appears that the arrangement depends on the weight of the building to resist wind uplift forces. It also appears that this arrangement has not been commonly built because of its excessive cost above that of a traditional building foundation. The fabrication and erection cost of this arrangement need to be reduced for it to be commonly built.

The proposed invention uses a unique foundation system to resist flood and wind damage. This system consists of a foundation raft assembly that serves as a floor, insulation, and foundation. This foundation raft assembly typically bears on grade, and floats during a flood. It is anchored and guided by steel poles embedded in the ground at its corners. This invention provides for an uninterrupted use of the building utilities during a flood.

The proposed invention is graphically described by the following drawings:

FIG. 1 a building elevation showing the foundation system bearing on grade.

Figure 2:
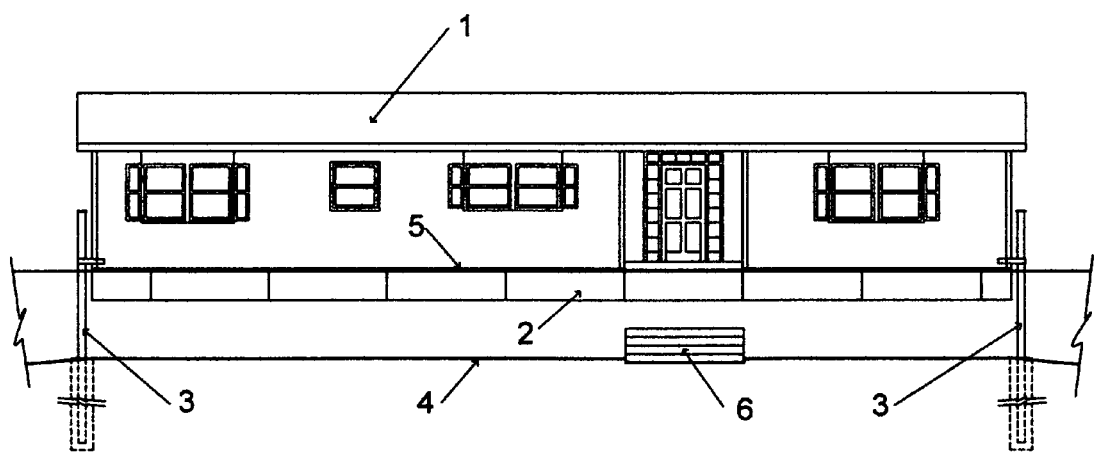

FIG. 2 a building elevation showing the foundation system floating during a flood.

Figure 3:
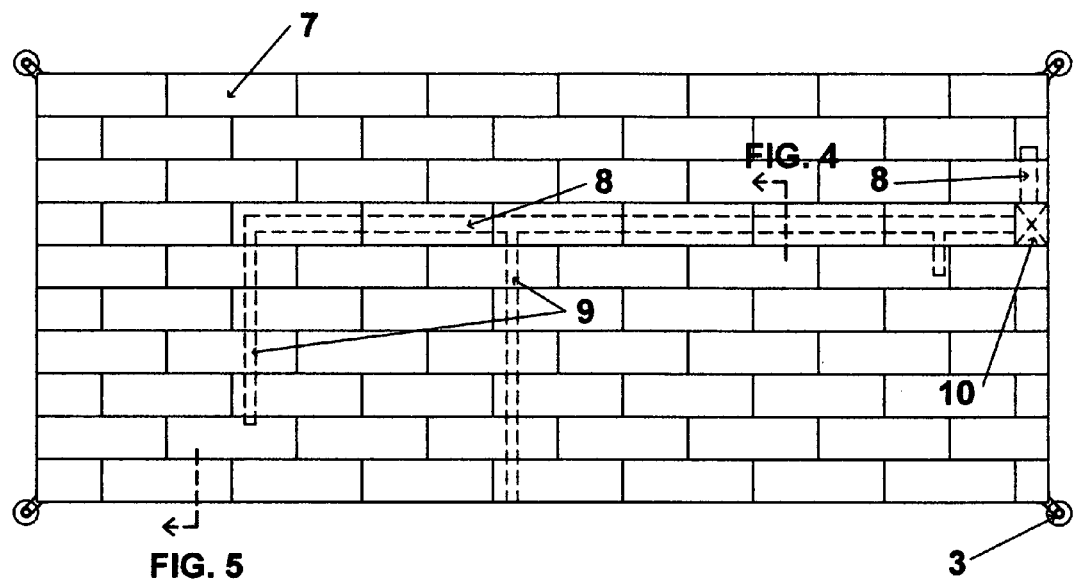

FIG. 3 a foundation plan showing the foundation raft assembly, plumbing trenches, and steel pole anchors with bent steel plate guides.

Figure 4:
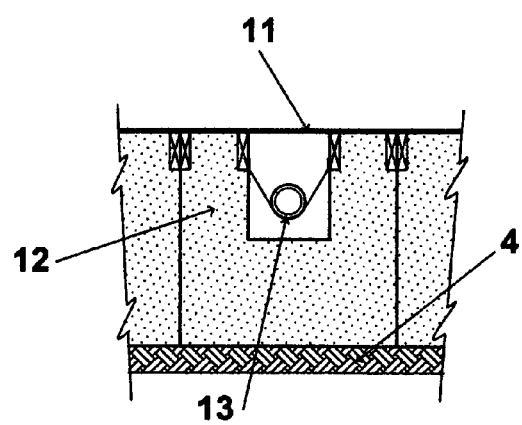

FIG. 4 a section through a plumbing trench showing a special flotation billet with pipe support accessories.

Figure 5:
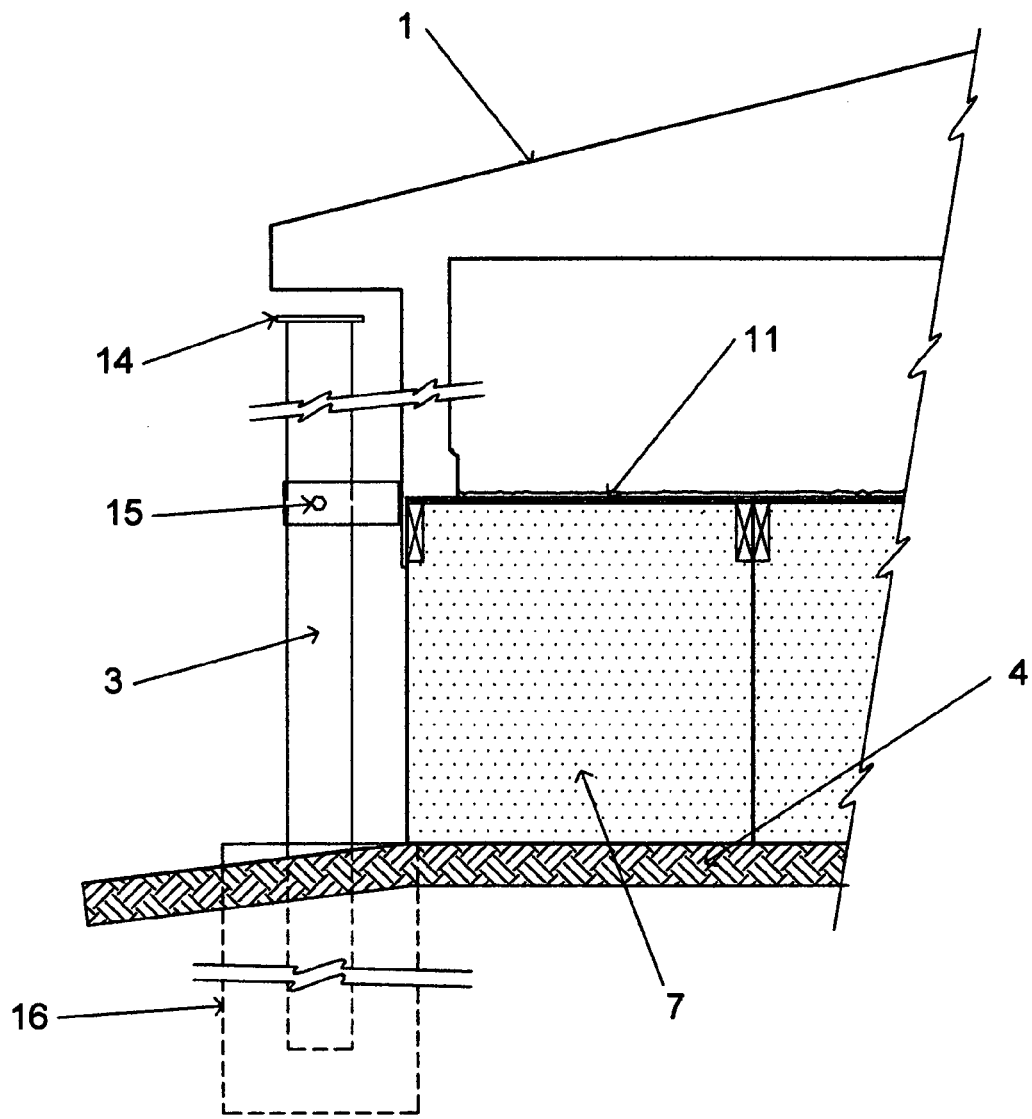

FIG. 5 a wall section showing the foundation system bearing on grade.

FIG. 1 and FIG. 2 show a building superstructure 1 of a standard single floor prefabricated modular home. The proposed invention can also be used for a site built superstructure of similar shape and materials. The foundation raft assembly 2 typically bears on grade 4, that is graded, compacted, and treated with a termite chemical soil barrier. The foundation rail assembly 2 floats at water level 5 during a flood. Steel pole anchors with bent steel plate guides 3 are made from hollow steel pipe and structural steel plate. The sizes and capacities of these members will be determined by structural analysis of the flood and wind forces resisted by the foundation system. The stationary steps 6 will continue to bear on grade 4 during a flood.

FIG. 3 shows a plan view of the foundation raft assembly composed of attached flotation billets 7 that are made of extruded polystyrene rigid insulation with a minimum 55 PCF flotation capacity. The standard flotation billet size equals 32×32×96 inches. The flotation billets 7 are manufactured with a 2×6 wood top inset frame, and covered with a polyethylene film moisture barrier. Steel pole anchors with bent steel plate guides 3 are attached at the foundation system corners. Large plumbing trenches 8 and small plumbing trenches 9 are made in the foundation raft assembly as required by the building superstructure plumbing layout. A plumbing access space 10 is made with a removable panel at a side of the foundation raft assembly. Water and sewer piping are installed in the plumbing trenches. The sewer discharge piping connects to the utility service piping with a pressure release coupling at the plumbing access space 10. The main water supply piping connects to the utility water piping with a 12 feet length of coiled pressure rated hose at the plumbing access space 10. Electrical and telephone service is of the standard overhead type.

FIG. 4 shows a special flotation billet 12 manufactured with a plumbing trench that has a 2×6 wood top inset frame at the trench perimeter. Pipe hangers 13 attached to the top inset frame support plumbing pipes. The special flotation billets 12 are manufactured from standard flotation billets, and typically bear on grade 4. The plywood deck 11 above the trench will be cut into removable panels for plumbing access.

The wall section drawing FIG. 5 shows the building superstructure 1 fastened to a plywood deck 11 composed of ½ inch single floor grade plywood panels. The plywood deck 11 is fastened to the standard flotation billets 7 that typically bear on grade 4. FIG. 5 also shows in elevation, the steel pole anchor with bent steel plate guide 3. The bent steel plate guide has a "U" shape with elongated feet at the legs. This guide wraps around the steel pole anchor, and its feet attach to the building stud wall sill plate and flotation billet frame with wood fasteners. A high tensile steel removable bolt 15 inserts through the steel plate guide and steel pole anchor when the foundation system bears on grade 4. This anchorage resists both lateral and uplift wind forces. The steel pole anchor 3 embeds in a circular concrete footing 16. The size and depth of the concrete footing will be determined by structural analysis of the flood and wind forces resisted by the foundation system. Prior to a flood, the removable bolts 15 are removed, which permits the foundation system to rise with the floodwater. This anchorage permits vertical movement, but resists horizontal movement caused by flood forces. The steel pole anchor 3 is fabricated with a steel plate endcap 14 that prevents liftoff of the foundation system during a flood.

The invention claimed is:

1. A flood and wind resistant building foundation comprising:
   a) a foundation raft assembly a plurality of right angle prism shaped solid buoyant floatation billets;
   b) treated wood inset frames attached flush with sides and tops around a top perimeter of said floatation billets;
   c) a protective wrap covering bottoms and sides of the floatation billets;
   d) the plurality of floatation billets attached together in a running bond pattern at said wood frames with galvanized metal framing anchors;
   e) treated wood structural floor panels attached to a top of said floatation billets,
   f) integral attachment of light wood framing superstructure to a top of said foundation raft assembly of same plan dimensions; and
   g) said building foundation bears on grade during dry conditions but floats on water during flood conditions.

2. A flood and wind resistant building foundation according to claim 1, further comprising:
   a) steel pipe anchors embedded in cylindrical concrete footings at foundation corners, extending to an underside of a superstructure roof overhang,
   b) bent steel plate guides curved around the steel pipe anchors attached to the foundation raft assembly and building superstructure;
   c) steel plate endcaps welded at a top of the steel pipe anchors to resist liftoff of the building foundation during flood conditions;
   d) removable steel bolts inserted thru the bent steel plate guides and steel pipe anchors to resist wind uplift during dry conditions; and
   e) said anchors and guides permit vertical movement but resist horizontal movement of the building foundation during flood conditions.

3. A flood and wind resistant building foundation according to claim 1, further comprising:
   a) modified floatation billets with plumbing trenches and access space to accommodate a building superstructure plumbing layout;
   b) treated wood inset frames attached flush with the sides and top of said billets along a top sides of the plumbing trenches and access space;
   c) metal pipe hangers attached to said wood inset frames to support building water and waste piping;
   d) removable treated wood structural floor panels attached to tops of said wood inset frames to permit plumbing maintenance; and
   e) a plumbing access space with modified water and waste piping connections to utility services that permit uninterrupted plumbing use during flood conditions.

* * * * *